ELECTRONIC CIRCUIT PACKAGE UTILIZING
CAMS FOR CIRCUIT CONNECTIONS

Filed April 23, 1964 4 Sheets-Sheet 1

INVENTORS: W. T. DRUGAN
J. S. HAGEN, JR.
G. J. SMITH
J. G. TRAUTMAN
BY Walter M. Hill
ATTORNEY July 5, 1966 W. T. DRUGAN ET AL 3,259,807

ELECTRONIC CIRCUIT PACKAGE UTILIZING CAMS FOR CIRCUIT CONNECTIONS

Filed April 23, 1964 4 Sheets-Sheet 2

July 5, 1966 W. T. DRUGAN ETAL 3,259,807

ELECTRONIC CIRCUIT PACKAGE UTILIZING CAMS FOR CIRCUIT CONNECTIONS

Filed April 23, 1964 4 Sheets-Sheet 4

3,259,807

ELECTRONIC CIRCUIT PACKAGE UTILIZING CAMS FOR CIRCUIT CONNECTIONS

Walter T. Drugan, Millington, John S. Hagen, Jr., West Caldwell, Goodwin J. Smith, Morristown, and John G. Trautman, Whippany, N.J.; said Hagen assignor to Western Electric Company, Incorporated, New York, N.Y., a corporation of New York, and said Drugan, Smith, and Trautman assignors to Bell Telephone Laboratories, Incorporated, New York, N.Y., a corporation of New York Filed Apr. 23, 1964, Ser. No. 362,202
7 Claims. (Cl. 317—101)

This invention relates to high density electronic circuit packages and more particularly to an improvement in a three dimensional package having a plurality of plug-in units or chassis, which may be readily removed to facilitate circuit changes or repair.

A variety of plug-in circuit packages have been known for several years as exemplified by U.S. Patents 2,864,977, granted December 16, 1958 to R. P. Witt et al.; 2,880,379, granted March 31, 1959 to H. F. Stoddart et al.; 2,885,603 granted May 5, 1959 to C. A. Rose; and 2,889,493, granted June 2, 1959 to R. K-F Scal et al. In all of the known prior art, including the above-illustrative patents, access to the plug-in package is through a terminal strip or plug unit located along only one of its edges or ends. This considerably limits the number of external connections which can be made. As circuit density is increased, however, it becomes more and more desirable to increase the number of possible interconnections between adjacent packages in all directions and by as short a route as is possible. Even if it would be practical to increase the number of external connections at the one end shown in the above patents, the circuit paths to packages adjacent other edges would be much longer than necessary or desired. Moreover, it would be impossible to provide as many connections on one end as would be needed in high density circuitry. It is, therefore, desirable that access be made available for interconnections from more than one edge or end of each package and that the connections between the access terminals of adjacent packages should be readily disconnected for quick removal and replacement of the packages to facilitate circuit changes and repair.

It is an object of this invention to rapidly connect and disconnect a plurality of adjacent circuit packages through rows of terminals arranged along at least two ends or sides of each package to permit ready removal of any one or more packages for circuit modification or repair.

A further object is to rapidly and simultaneously connect a circuit package to all adjacent circuit packages whether positioned laterally or endwise and to rapidly disconnect them again to permit their ready removal.

The foregoing objects are achieved by this invention which comprises an electronic circuit package made up of a plurality of chassis containing electric circuits and arranged for sliding into individual parallel compartments in a rack. The connections between the circuits of adjacent chassis are completed through cams secured to a cam shaft rotatably supported in the rack and adapted to engage a plurality of contact springs supported around the periphery of the chassis. By merely rotating these cams to their disconnect position, the chassis may be removed from the rack.

The invention may be better understood by reference to the accompanying drawings, in which.

Figure 1:
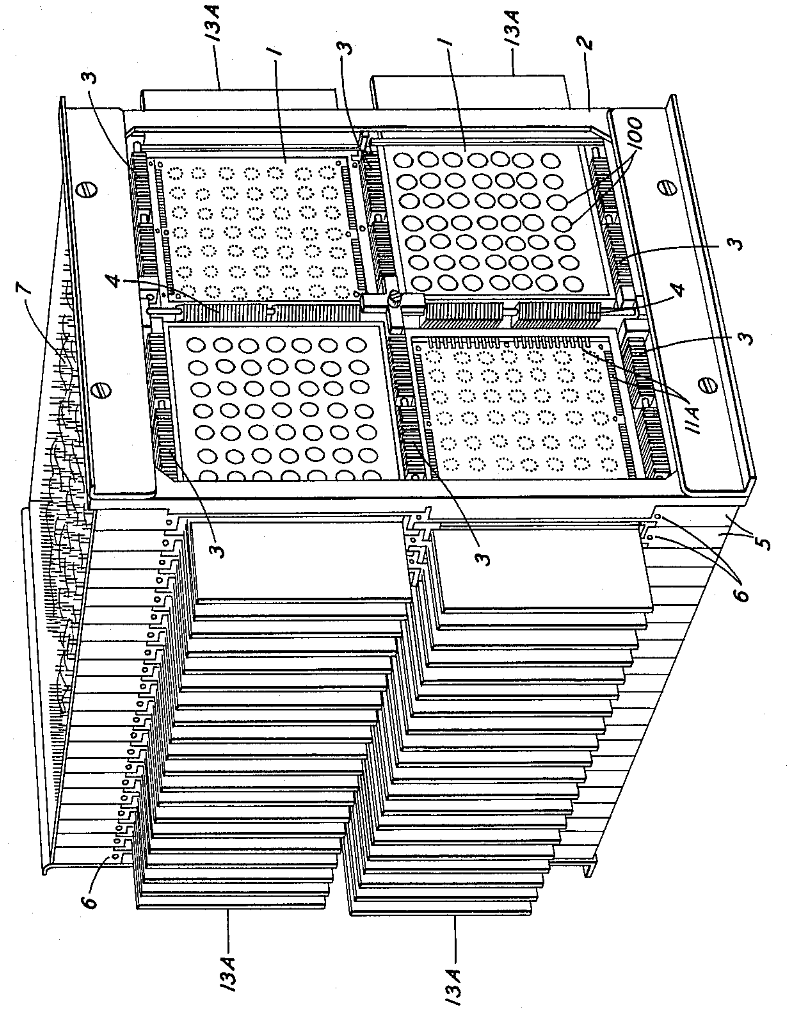
FIG. 1 illustrates a functional subsystem of a circuit package containing eighty removable chassis, each containing forty-nine TO-5 header integrated circuit packages which are capable of containing up to six solid state device circuits in each package.

FIG. 1 shows a subsystem mounted in a rack 2 containing a plurality of circuit chassis 1. A complete system may comprise any number of subsystems such as shown in FIG. 1. As illustrated, the rack contains four groups of twenty chassis or a total of eighty which may be individually removed. A plurality of parallel compartments for guiding and supporting the chassis in the rack are formed by the cam carriers 5, to be subsequently described. Interconnections between chassis are effected through a system of horizontal cam units 3 and vertical cam units 4. The horizontal cam units may be rotated to a first angular position to complete connections between contact springs at the edges of the chassis and to a second angular position to break such connections and to free the chassis so that they may be slidably removed from the rack. The vertical cam units 4 are fixed in position as they need not be rotated in order to remove the chassis. While it is quite possible that these vertical cam units may be replaced by the conventional plug and receptacle structure shown in the above-cited patents, the cam arrangement shown in FIG. 1 is preferred because it permits greater flexibility for interconnection and also increases the number of possible interconnections. All of the vertical and horizontal cam units 3, 4 visible in FIG. 1 are supported by a pair of cam carriers 5 which are described in more detail with reference to FIG. 4. However, at the moment it may be said that the three rotatable horizontal cam units 3 at the left, as well as the upper vertical cam unit 4 are supported by one of the pair of cam carriers while the other three horizontal cam units and the lower vertical cam unit are supported by the other of the pair of cam carriers. When a cam carrier is removed, its three horizontal cam units and the one vertical cam unit are withdrawn with it for modification or repair.

The centrally located horizontal cam units, when rotated, complete connections between a chassis and three of its adjacent neighbors, i.e., the cam elements on each of these cam units completes a plurality of connections between two adjacent chassis in the upper row and two chassis in the lower row. The upper and lower horizontal cam units, when rotated, similarly complete connections between two adjacent chassis as well as to two rows of terminals leading to the terminal field 7 shown at the top in FIG. 1. A similar field also exists on the underside of the subsystem. The terminal pins comprising the terminal field 7 may be interconnected by any conventional means such as wire wrap or solder and also may be connected by conventional means to similar terminal field pins in an adjacent subsystem.

Figure 2:
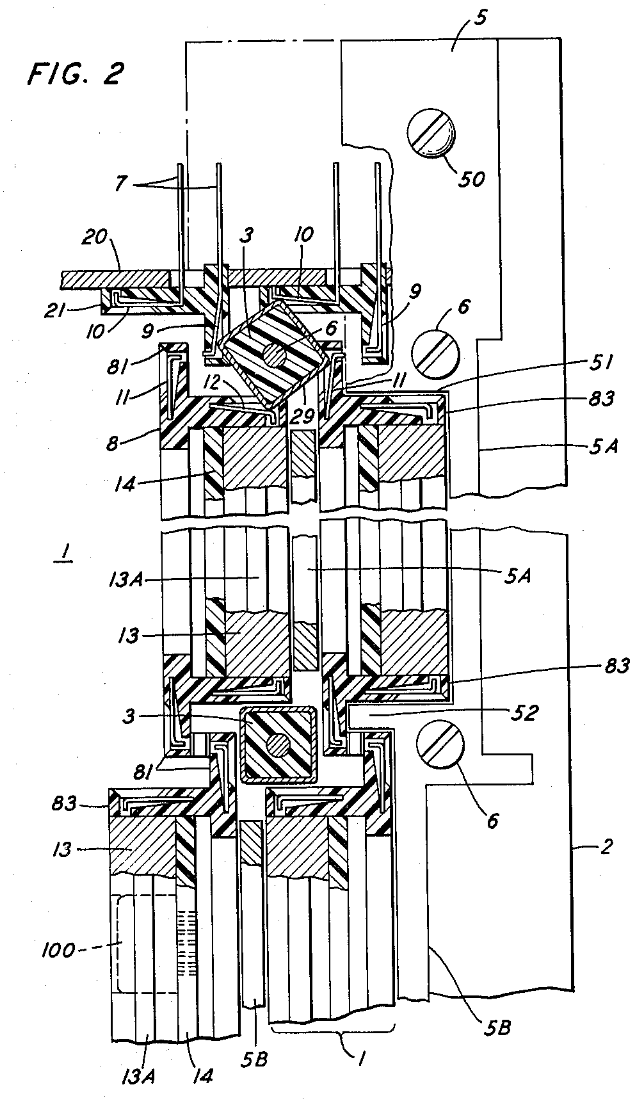
FIG. 2 is an elevation view in partial section of the chassis and a portion of the horizontal cam unit structure shown in FIG. 1.

The elevation view shown in FIG. 2 discloses the relationship between the horizontal cam units 3 and their adjacent chassis as well as the terminal field springs. Here it will be noted that the chassis 1 in the upper row face in one direction while the chassis in the lower row face in the opposite direction. Each of these chassis supports a plurality of integrated elementary circuit packages such as the TO-5 header package 100 shown at the lower left of FIG. 2. These packages will be recognized as one of those standardized by the Joint Electron Device Engineering Council (JEDEC) and adopted by the entire electronics industry. It is listed on page 5 of the JEDEC Publication No. 12B, entitled, "Outlines for Semiconductor Devices" dated July 1960 and published by the Electronic Industries Association. These packages may contain a variety of semiconductor devices interconnected within the package as an integrated circuit and having external connections made through a plurality of leads extending out of the base of the package. Their arrangement within the chassis is more clearly illustrated in FIG. 1. These circuit packages are supported within a metallic plate 13 acting as the heat sink, an outer extension of which appears as a reduced section 13A which performs the double function of a cooling fin as well as a convenient handle by which the chassis may be inserted and withdrawn from the rack. The terminal pins of this package 100 are preferably connected to a multilayer printed circuit board 14 by which the various terminals of the packages 100 may be interconnected as desired and connected to the contact springs 11 and 12 in the access frame 8. The access frame 8 is secured along the top and bottom parallel sides of the chassis and is constructed of insulating material, preferably molded. These access frames 8 serve the double function of supporting the contact springs 11 and 12 as well as to serve as guides as the chassis are slid into their compartmens. The compartments are formed by the flat sides 5A and 5B of each of the cam carriers 5 to be described in greater detail with reference to FIG. 4. In FIG. 2 it will be noted that the upper right chassis has been inserted into a compartment surrounded by cam carrier plates 5A of two adjacent cam carriers 5 and at its top and bottom by leftwardly projecting portions 51 and 52 of the right hand cam carrier. This accurately positions, both vertically and horizontally, the chassis within its compartment.

Before the chassis can be inserted in its compartment, the upper cam unit 3 must be rotated clockwise 45 degrees so that it assumes the disconnect position shown by the centrally located cam unit 3 in this figure. Only an upper and a centrally located cam unit are shown in this partial section. The centrally located cam unit is shown rotated clear of all of its adjacent contact springs and in a position providing clearance for withdrawal of the chassis. When the upper cam unit is similarly positioned as described, both the upper and lower cam units provide clearance so that the upper right chassis may be removed. It will be understood that if the second chassis in the upper row is to be removed both of these cam units must be rotated into their disconnect positions as well as the two adjacent cam units immediately to their left, not shown in FIG. 2. The cam units comprise a cam shaft 6 surrounded by insulating material carrying about its periphery a cam element 29 of conductive material. It is to be understood that the width of this cam element is of about the same order of magnitude as the width of its cooperating contact springs and that a plurality of them are situated along the length of cam unit 3 as suggested by the showings thereof in FIG. 1. These cam elements are insulated from each other and function to complete connections between any desired combination of their associated cam springs. Moreover, instead of extending completely around their insulating support with four lobes, they may extend only part way so as to have only two or three lobes, as the circuit conditions may require. Cam shaft 6 has its outer end slotted as illustrated for the right hand carrier in FIG. 2. This slotted end permits rotation of the cam unit with an ordinary screwdriver. A stop limit means of a conventional type, not shown, limits the degree of rotation of the cam unit between the two positions illustrated for the two horizontal cam units shown in section in FIG. 2. The connections between the contact springs 11 and 12 and the printed circuit board 14 are not shown in FIG. 2 but will be described with reference to FIG. 3. The vertical and horizontal field contact springs 9 and 10 are shown supported by their field spring support 21 of insulating material, the latter being secured by any conventional means to the upper field support plate 20. The upper ends of these contact springs extend into the upper terminal field and comprise the terminal field pins 7 shown here and in FIG. 1.

Figure 3:
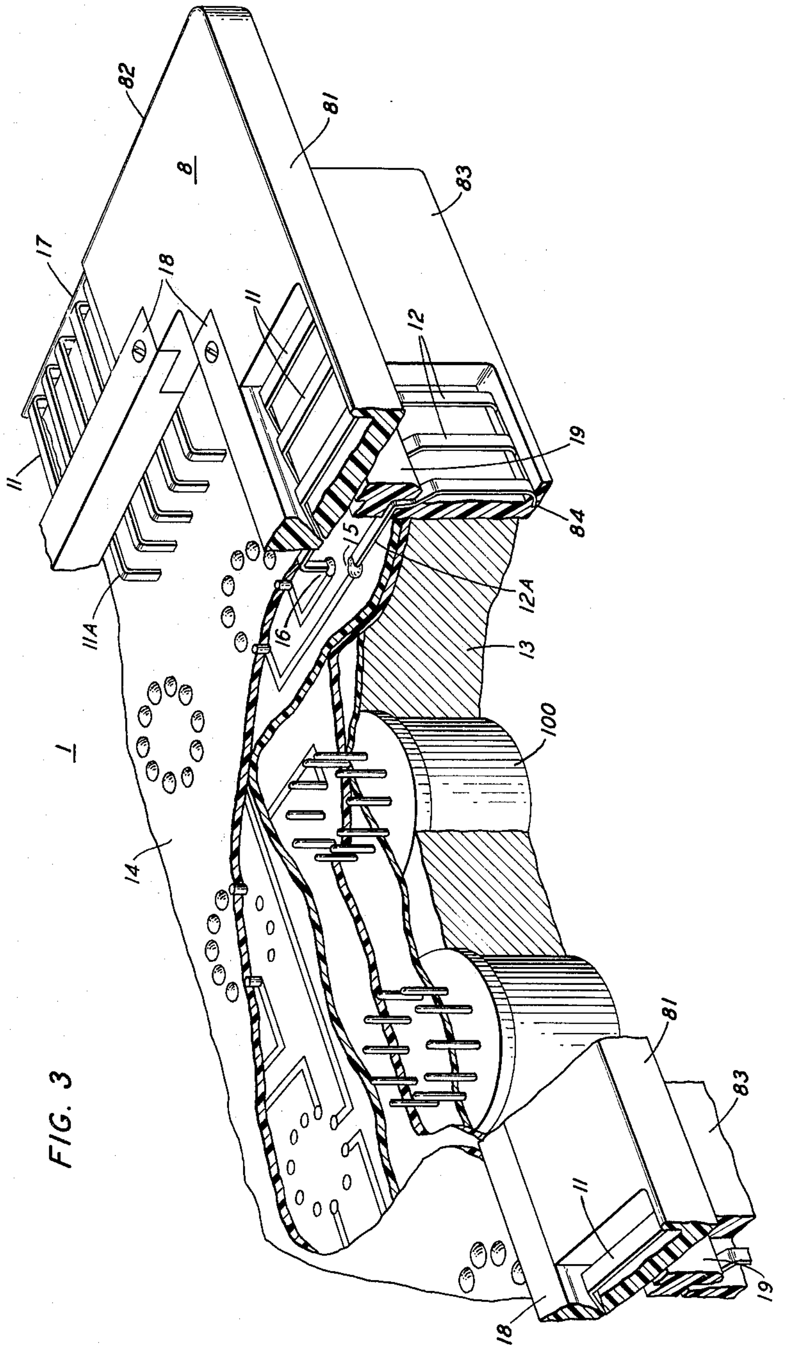
FIG. 3 is a partial section perspective view of a corner of one of the chassis showing one method of connection between the TO-5 packages and between these packages and the access contact springs.

FIG. 3 shows a typical chassis construction in much greater detail including the interconnections between the various contact springs and the printed circuit board 14. This figure shows only a portion of the access frame construction at a corner of the chassis. For convenience, an access frame presenting its contact springs to cam elements positioned endwise of the chassis is designated as an endwise access frame, exemplified by access frame 83, while the flange portion presenting its springs laterally, such as flange 81, is designated a lateral access frame flange. The springs in the lateral access frame flanges thus lie in a plane parallel to the direction of motion of the chassis as it is inserted in its compartment while the springs in the endwise access frames are in planes perpendicular to that motion. The rear lateral access frame flange 82 is shown formed integral with the top lateral access frame flange 81. It is not clear in this figure that the top endwise access frame 83 is also integral with flanges 81 and 82 but it is preferred that these parts be molded as an integral unit. Flanges 81 and 82 are identical in every respect except one, the single difference residing in a cutaway portion 17 on flange 82 which provides clearance for the entrance of the lobes on the fixed cam units 4 shown in FIG. 1. Thus, as the chassis is inserted in its compartment, contact springs 11 on flange 82 engage cam lobes on a vertical cam unit 4 and are deflected toward their flanges to make firm contact with the cam elements. While not specifically disclosed in FIG. 3, it should be understood that the rear lateral access frame flange 82 also has a companion endwise access frame corresponding to and identical with endwise access frame 83 and that the lateral and endwise access frames 81 and 83 shown in FIG. 3 exist at both the top and bottom parallel sides of the chassis as indicated in FIG. 2. The lateral chassis contact springs 11 are shown in place and secured by means of an insulating bar 18 held to the flanges by means of screws as illustrated. In each section, a plurality of springs 11 are put in place and the bar 18 placed down over all of them. The outer ends of the springs 11 rest in a recess such as illustrated at 84 for the endwise contact springs 12. The springs are thereby securely held in place with sufficient space between the undersides of the springs and the access frame to permit the cam lobes to deflect the springs during engagement. The inner ends of the springs 11 extend to a bent portion 11A which terminate on printed circuit lands where they are secured by solder as illustrated at 16. Similarly, the inner ends 12A of springs 12 are soldered to circuit lands as illustrated at 15. A removable bar 19, corresponding in function with bar 18, is used to hold a plurality of the endwise contact springs 12 in place.

The printed circuit board 14, as shown in FIG. 3, is of the multilayer type and the pins from the integrated circuit packages 100 extend through holes in this multilayer board and are connected to the printed circuit lands in accordance with conventional practice. It is apparent that conventional wiring could replace the printed circuit board but this is not preferred for high density packages.

Figure 4:
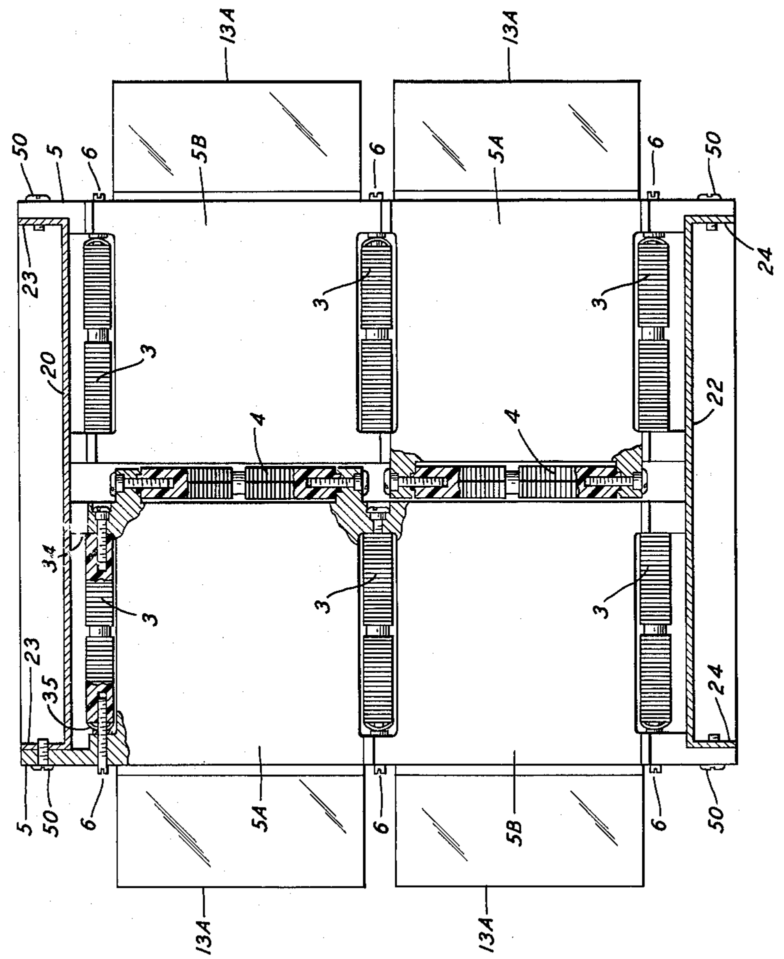
FIG. 4 is a side view of a pair of cam carriers showing how the cam units are supported therein.

FIG. 4 illustrates more clearly an elevation section through the subsystem of FIG. 1 taken with all four of the near chassis removed to expose a pair of identical cam carriers. Cam carrier 5 on the left side supports the upper vertical cam unit 4 and the three horizontal cam units 3 extending to the left of the center. This cam carrier is secured by mounting screws 50 through its upper and lower flanges to the upper and lower field support flanges 23 and 24, respectively. When these screws are removed, the cam carrier 5, with its three horizontal cam units and its single vertical cam unit, may be withdrawn from the circuit package. The right hand cam carrier with its three horizontal cam units and the lower vertical cam unit is similarly removed. The partial sections in this figure clearly show how the vertical cam units 4 are secured in fixed positions to the carrier plates. The horizontal cam units are rotatably supported with their inner ends resting against a thrust bearing 34 and their outer ends urged rearwardly by a thrust spring 35. In this figure, the horizontal cam units are all shown in their disconnect position but when rotated to their connect position they would present a view similar to that shown for the vertical cam units 4.

Each of the cam carriers 5 has a cam carrier plate 5A and a cam carrier plate 5B which are offset in parallel planes, this being more clearly discerned by reference to FIG. 2. This offset is in order to permit chassis with identical outline dimensions to be used in both the upper and lower rows by merely inverting them when changing them from one row to the other. This inversion positions their access frames in such a way as to present all of the adjacent contact springs to one cam unit as illustrated in FIG. 2.

Referring again to FIG. 4, the upper and lower field support plates 20 and 22 are shown with all of the terminal pins 7 removed. However, it is to be understood that these pins are supported by their respective plates in the manner illustrated at the top of FIG. 2.

Figure 5:
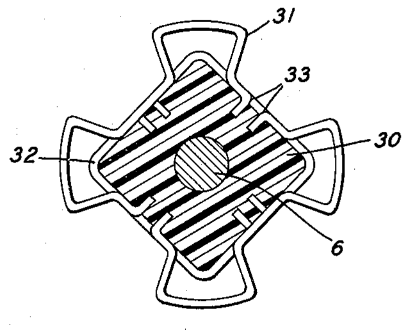
FIG. 5 shows an alternative cam structure.

FIG. 5 shows an alternative cam construction in which the shaft 6 is surrounded by an insulating cam support 30 containing a retaining groove 32 around its periphery for each cam element. The bottoms of these grooves have a plurality of cam mounting slots 33. The double-lobed cam element 31 which, if positioned as shown and in place of the upper cam in FIG. 2, would connect the horizontal field contact spring 10 to a vertical contact spring 9. At the same time, its companion double-lobed cam element would connect the lateral chassis contact spring 11 to the endwise chassis contact spring 12. These cam lobes may have a width commensurate with the width of the springs with which they will engage. Alternatively, one or more lobes could be made wider so as to bridge two or more adjacent springs in either the horizontal or vertical spring rows. It is also obvious that the cam elements 31 may be made with three or four lobes instead of the two illustrated. The advantage of this cam structure is that the cam lobe arrangement can be more readily changed to a variety of combinations by merely snapping these cam elements out of their supports and replacing them with others.

It is obvious that various modifications of cam structure may be employed to effect the same functional result and therefore not depart from the scope of the invention. Also various modifications of contact spring structure will be apparent to those skilled in this art. Numerous conventional mechanical details, such as the stop limit means, have not been shown in these figures for the sake of clarity and to simplify the description. Their disclosure is unnecessary to a complete understanding of the invention and may be readily added by any person skilled in the mechanical art.

What is claimed is:

1. In an electronic circuit package of the type comprising a rack having a plurality of compartments with parallel side walls to slidably receive a plurality of circuit chassis, each chassis having two of its opposite sides arranged parallel for slidable entry between the side walls of said compartments, having electric circuits contained within it, and having connecting terminal means at its inner end to make connections with a stationary cooperating connecting means in said rack as the chassis is inserted in its compartment, the improvement comprising a terminal access frame secured along each of the parallel sides of said chassis, each frame including a plurality of contact springs connected to said electric circuits, cam shafts rotatably supported in said rack with their axes of rotation parallel to the parallel sides of the chassis, a plurality of conductive cam elements having lobes, said elements secured to each cam shaft and so arranged that their lobes may engage contact springs on all adjacent access frames as said shaft is rotated to a first angular position and will disengage from said springs to permit slidable withdrawal of said chassis from their compartments as said shaft is rotated to a second angular position.

2. The combination of claim 1 wherein connecting terminal means at the inner end of the chassis comprises an additional terminal access frame secured along said inner end and said stationary cooperating connecting means comprises an additional cam shaft with cam elements, said shaft with its elements being supported by said rack in a fixed position.

3. The combination of claim 2 wherein said terminal access frame and said additional terminal access frame each includes a pair of contact spring groups, one group arranged in a plane parallel to the direction of motion as the chassis is inserted in its compartment and the other group arranged in a plane at right angles to the first group.

4. The combination of claim 1 wherein each terminal access frame includes a pair of contact spring groups, one group arranged in a plane parallel to the direction of motion as the chassis is inserted in its compartment and the other group arranged in a plane at right angles to the first group.

5. The combination of claim 1 wherein said cam shafts are supported by a removable cam carrier frame secured to said rack.

6. The combination of claim 1 wherein said cam elements are each individually removable from their shafts so that they may be replaced by cam elements having a different number of lobes.

7. An electronic circuit package comprising a rack having a plurality of compartments with parallel side walls to slidably receive circuit chassis, a plurality of circuit chassis each having two parallel plane surfaces with the edges at two opposite ends thereof arranged parallel for slidable entry between the side walls of said compartments, electric circuits contained in each chassis, a terminal access frame secured to at least two ends of said chassis, each frame comprising a plurality of contact terminals connected to said electric circuits, cam shafts rotatably supported in said rack with their axes of rotation parallel to the parallel side walls of said compartments, and a plurality of conductive cam elements secured to each cam shaft and so arranged that their lobes may engage contact terminals on all adjacent access frames as said shaft is rotated to a first angular position and will disengage from said terminals to permit slidably withdrawing said chassis from their compartments in said rack as said shaft is rotated to a second angular position.

References Cited by the Applicant

UNITED STATES PATENTS

| | | |
|---|---|---|
| 1,750,246 | 3/1930 | Serrell. |
| 2,864,977 | 12/1958 | Witt et al. |
| 2,880,379 | 3/1959 | Stoddart et al. |
| 2,885,603 | 5/1959 | Rose. |
| 2,889,493 | 6/1959 | Scal et al. |
| 2,907,926 | 10/1959 | Slack. |
| 2,955,236 | 10/1960 | Luhn. |

ROBERT K. SCHAEFER, *Primary Examiner.*

KATHLEEN H. CLAFFY, *Examiner.*

W. C. GARVERT, *Assistant Examiner.*